May 23, 1933.  W. S. FREEBURG  1,910,687
METHOD OF AND APPARATUS FOR APPLYING WIRE LEADS
TO ELECTRICAL RESISTOR UNITS
Filed Oct. 12, 1931   8 Sheets-Sheet 8
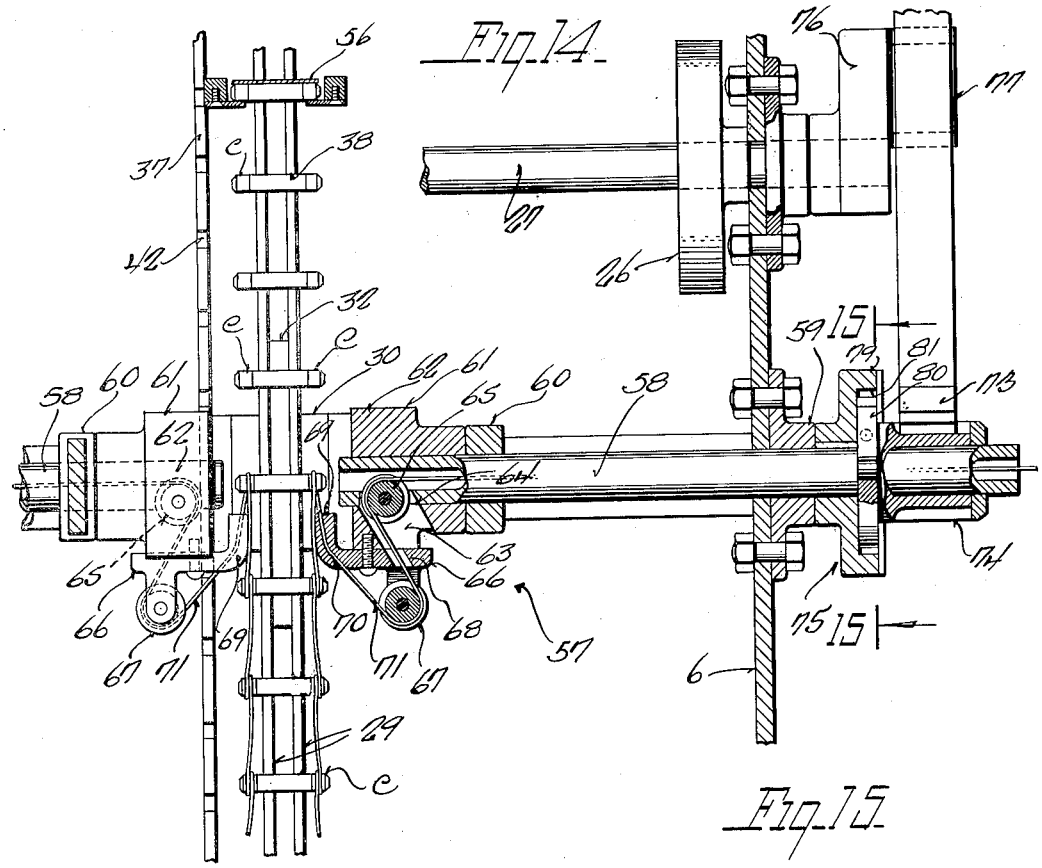
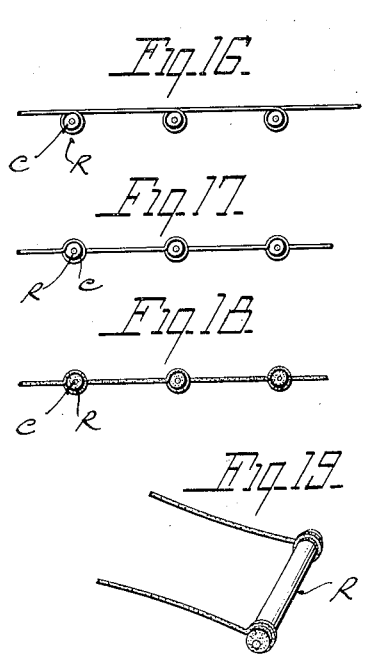
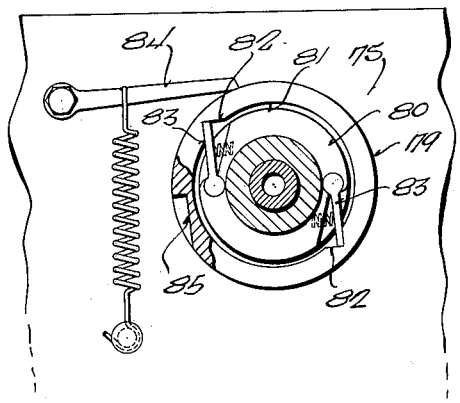
Inventor
Walter S. Freeburg
By Ira Milton Jones.
Attorney Patented May 23, 1933

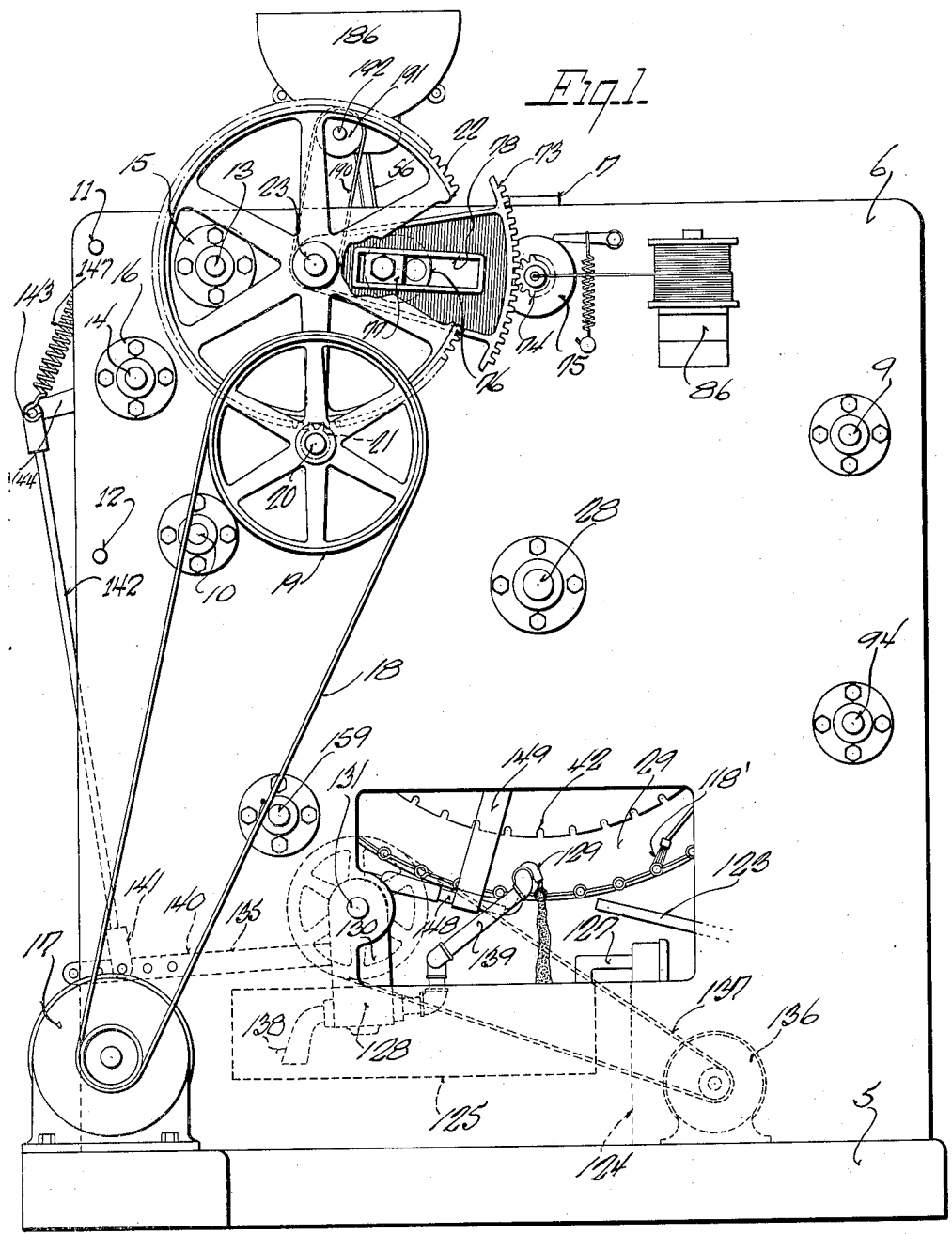

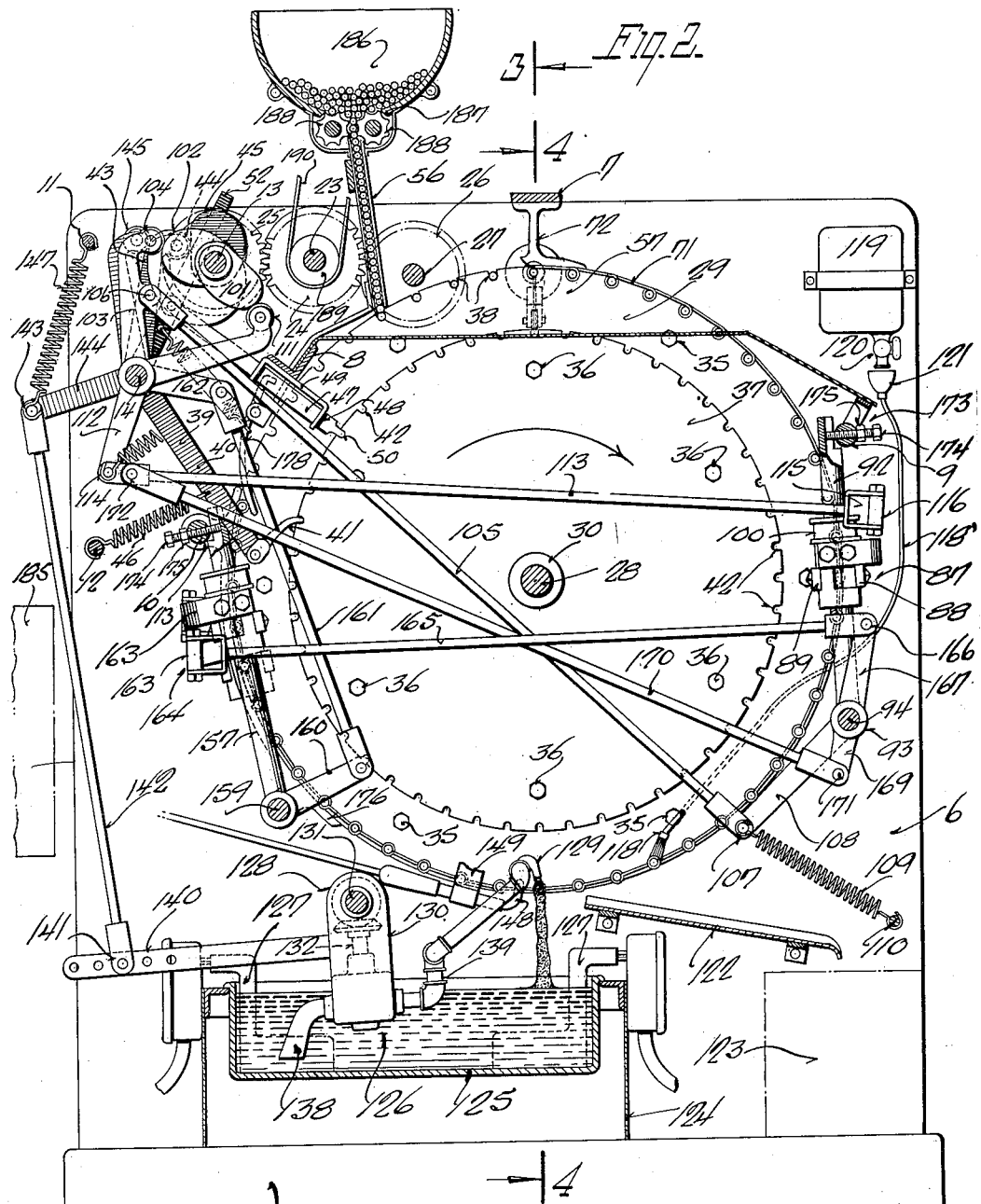

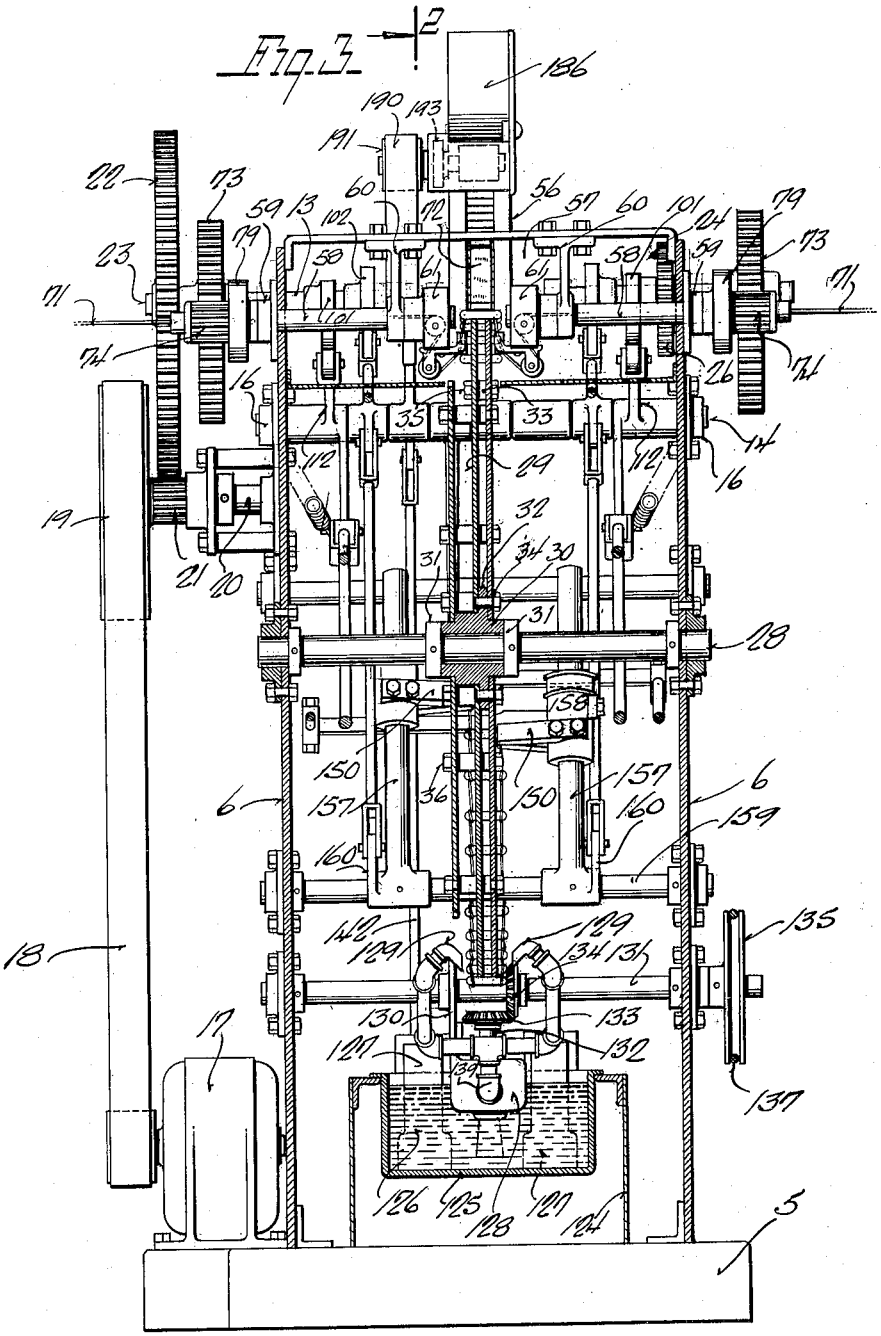

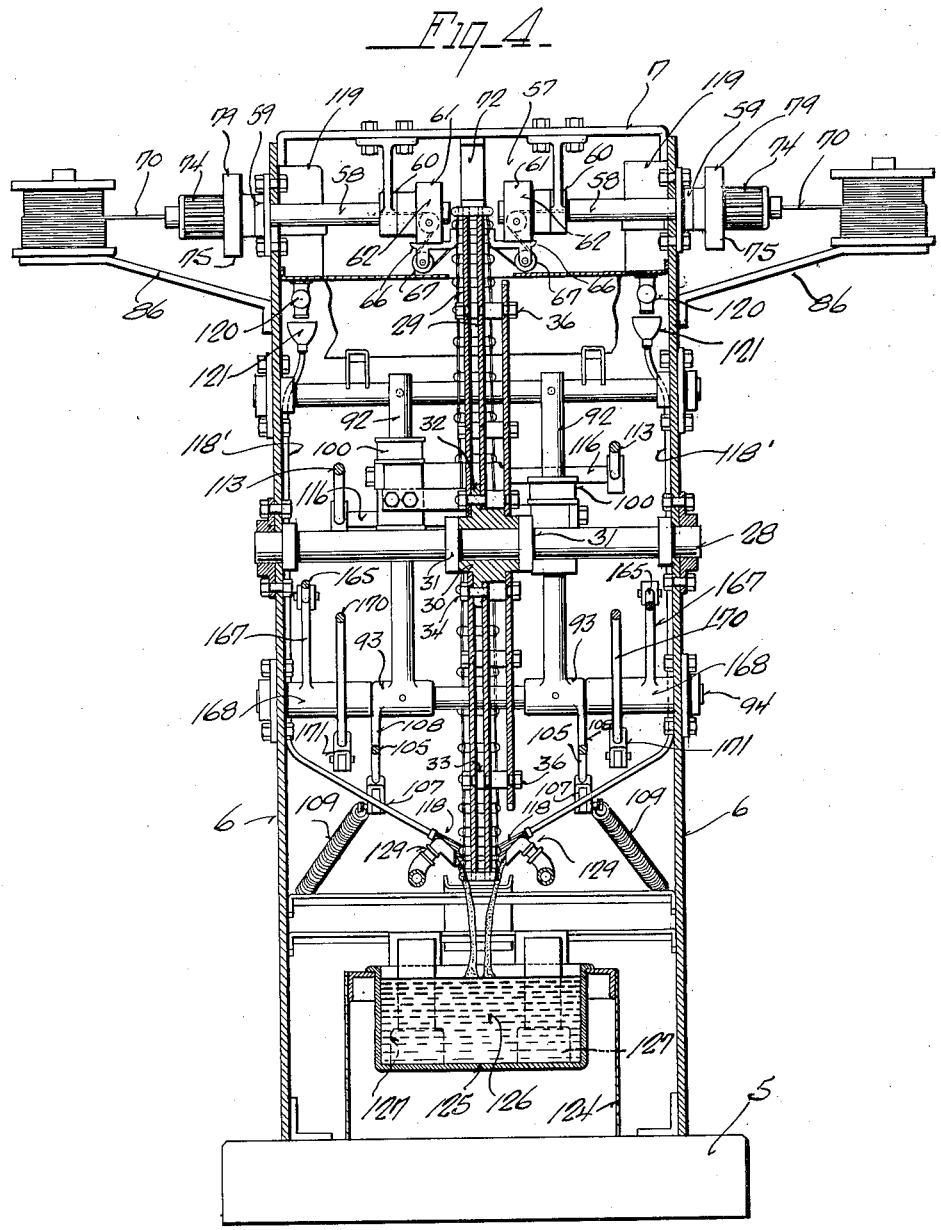

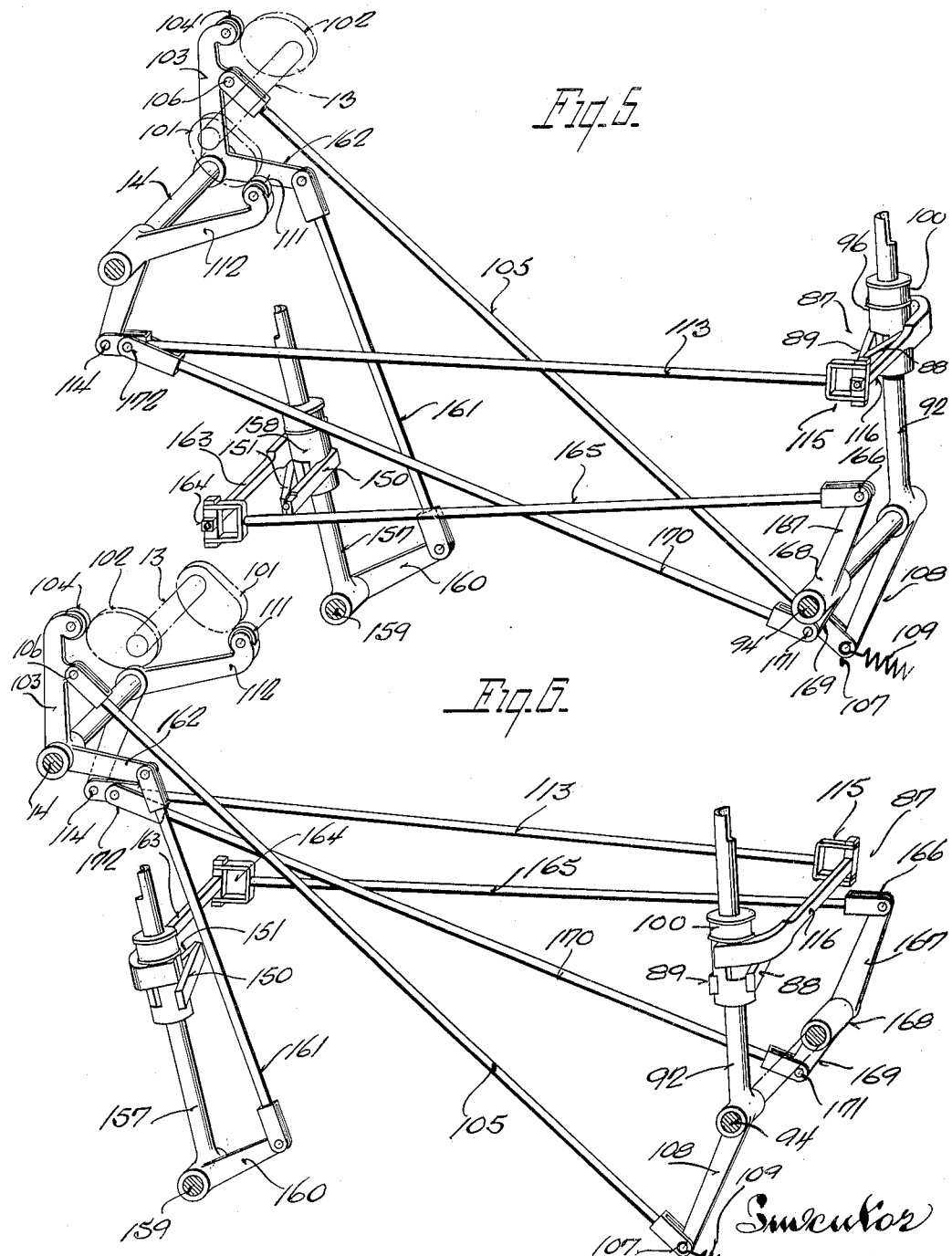

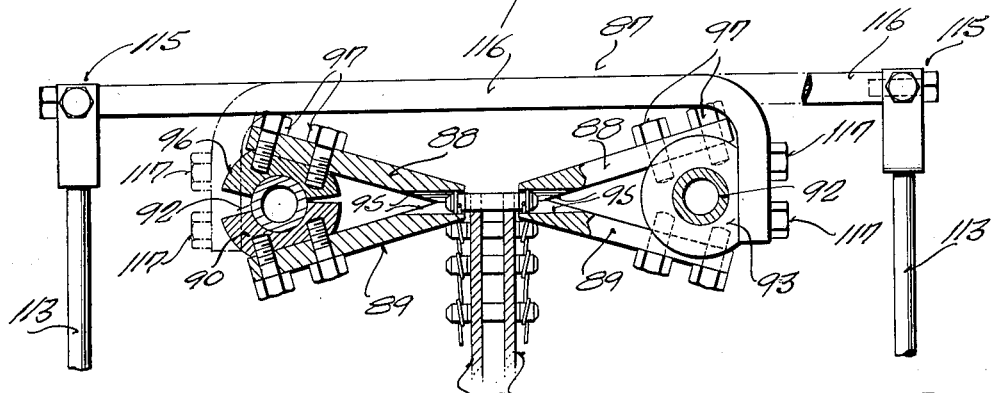

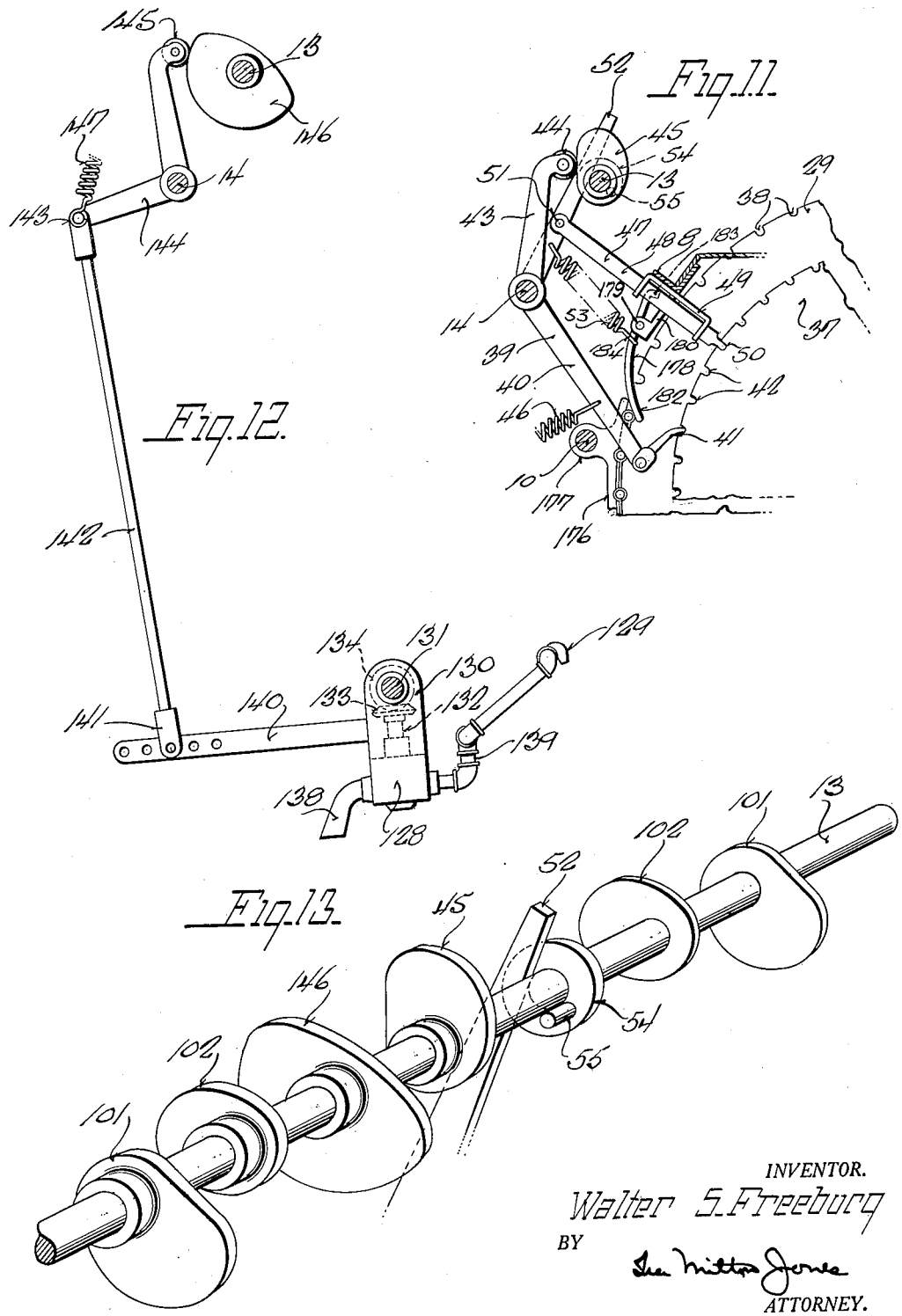

1,910,687

UNITED STATES PATENT OFFICE

WALTER S. FREEBURG, OF MILWAUKEE, WISCONSIN, ASSIGNOR, BY MESNE ASSIGNMENTS, TO ALLEN-BRADLEY COMPANY, OF MILWAUKEE, WISCONSIN, A CORPORATION OF WISCONSIN

METHOD OF AND APPARATUS FOR APPLYING WIRE LEADS TO ELECTRICAL RESISTOR UNITS

Application filed October 12, 1931. Serial No. 568,487.

This invention relates to machines for use in the manufacture of electrical resistor units and refers more particularly to a machine for automatically applying wire leads to the terminals of the units.

As is well known, the conventional electrical fixed resistor unit comprises a body of resistance material to the ends of which metal caps are secured which provide terminals, and to facilitate the connection of the units in circuits with which they are to be used it is desirable to equip the terminals with wire leads.

These wire leads are secured to the end caps by winding one end portion about the caps and soldering the same, and it is an object of this invention to provide a machine which applies these wire leads to the units automatically.

Another object of this invention is to provide a machine for automatically attaching wire leads to the terminals of a resistor unit in such a manner as to permit continuity of manufacture.

Another object of this invention resides in the provision of a machine of the character described which is readily adaptable to resistor units of various sizes.

A further object of this invention resides in the provision of a machine of the character described which permits the units to be fed from a hopper and which takes the wire for the leads from spools so as to require a minimum amount of attention.

With the above and other objects in view which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, is illustrated one complete example of the physical embodiment of the invention constructed according to the best mode so far devised for the practical application of the principles thereof, and in which:

Figure 1 is a side elevation of a machine embodying this invention;

Figure 2 is a section through the machine taken on the plane of the line 2—2 of Figure 3;

Figure 3 is a cross sectional view taken through Figure 2 on the plane of the line 3—3;

Figure 4 is a view taken through Figure 2 on the plane of the line 4—4 and viewing the machine in a direction opposite that of Figure 3;

Figures 5 and 6 are perspective detail views illustrating the lever means for effecting the actuation of certain elements of the machine;

Figure 7 is a detail view of the crimper mechanism for tightening the wire leads about the end caps;

Figure 8 is a detail perspective view of part of the crimper mechanism with its elements separated;

Figure 9 is a detail perspective view of one set of cutters for cutting the wire leads;

Figure 10 is a detail view illustrating the means for ejecting the finished units from the machine;

Figure 11 is a detail view illustrating the means for advancing the disc conveyer for carrying the units through the machine and the means for ejecting the units;

Figure 12 is a detail view of the means for moving the soldering apparatus into operative position;

Figure 13 is a perspective view of the cam shaft illustrating the relationship of the cams;

Figure 14 is a detail view of the mechanism for winding the wire about the ends of the resistor units;

Figure 15 is a detail view taken through Figure 14 on the plane of the line 15—15, and Figures 16, 17, 18 and 19 illustrate the condition of the wire leads and the units at different stages of completion.

In general, the machine of this invention comprises a disc conveyer element which has means at its peripheral edge for carrying a plurality of resistor units, and which is intermittently advanced to simultaneously present successive units to various mechanisms which function during the rest periods of the disc conveyer.

These mechanisms comprise a wire winder for winding wire from a spool about the end terminals of the units; a crimper for tightening the coil of wire about the terminals; a soldering unit for soldering the wire coils to the terminals; a cutter for cutting the wire links connecting the adjacent units; and an ejector for forcibly projecting the units from the machine into a receptacle or other suitable means of collection.

Referring now more particularly to the accompanying drawings, in which like numerals designate like parts throughout the several views, the numeral 5 represents a base from which two upright spaced parallel side plates 6 project. The plates 6 are connected by an upper cross piece 7, an angle iron cross member 8, and a plurality of cross bars 9, 10, 11, and 12.

At the upper portion of the side plates a cam shaft 13 and a rocker shaft 14 are mounted in suitable bearings 15 and 16, respectively, carried by the side plates. The cam shaft is continuously rotated and all of the various mechanisms of the machine are driven therefrom.

The drive for the cam shaft is taken from a motor 17 mounted on the base 5 and drivingly connected through a belt 18, with a pulley 19 fixed to a stub shaft 20 journalled in suitable bearings carried by the adjacent side plate. The stub shaft 20 also mounts a pinion 21 which meshes with a gear wheel 22 fixed to a cross shaft 23 journalled in bearings carried by the side plates. At the opposite side of the machine the shaft 23 mounts a gear 24 which meshes with a gear 25 fixed to the cam shaft and also with a gear 26 fixed to a cross shaft 27, which like the shaft 23 is suitably journalled in bearings carried by the side plates.

The cam shaft 13 is thus continuously driven and through mechanism hereinafter to be described, effects the operation of the entire machine.

At a central point the side plates 6 mount a cross shaft 28 upon which the disc conveyer element for carrying the units through the machine is positioned. In the present instance this disc conveyer comprises two similar discs 29 fixed to a hub 30 which is freely rotatably journalled on the shaft 28 and held in a central position thereon by fixed collars 31. The discs 29 are spaced apart by a flange 32 on the hub and by suitable spacers 33 adjacent their peripheries. Cap screws 34 serve to fix the plates to the flange on the hub, and bolts 35 and 36 which also pass through the spacers 33, connect the plates at their peripheral edge portions. The bolts 36 project beyond one of the disc elements and through a plate 37, whose central portion receives a part of the hub 30. The plate 37 is thus rigid with the disc conveyer element and, in a manner to be later described, serves as part of the means for advancing the disc conveyer.

The peripheral edges of the discs 29 have aligned equi-spaced notches 38 to receive the resistor units and carry them through the machine. The size of the notches obviously depends upon the diameter of the units for which the machine is designed and the pitch of the notches or the distance therebetween is governed by the length of the leads it is desired to equip the units with.

In machines designed for applying leads to small resistor units, the double discs 29 are replaced by a single disc of a thickness governed by the length of the unit.

The means for intermittently advancing the disc conveyer to simultantously present the units carried thereby to the various mechanisms hereinbefore noted, consists of a lever 39 medially pivoted on the rocker shaft 14 and having its lower arm 40 provided with a pawl 41 engageable in notches 42 formed in the peripheral edge portion of the plate 37. The other or upper arm 43 of the lever mounts a roller or cam follower 44 which is adapted to track on a cam 45 fixed to the cam shaft 13.

As best illustrated in Figure 11, the cam 45 is so shaped that during approximately 135 degrees of its rotation it rocks the lever 39 in a direction to advance the disc conveyer. During the remainder of the cam shaft rotation, the lever 39 is either being returned or is at rest, and to insure the roller 44 tracking on the cam at all times, a spring 46 is connected with the lever arm 40 and a suitable fixed support.

The motion imparted to the lever 39 by the cam 44 is sufficient to rotate the disc conveyer one step or a distance equal to the pitch of the unit carrying grooves, and to positively arrest the motion of the disc at the completion of this movement, a stop 47 is provided.

The stop 47 consists of a bar 48 slidably mounted in a bracket 49 carried by the angle iron cross piece 8, to engage its inner end 50 in one of the notches 42 in the plate 37 as the same is aligned therewith. The opposite end of the bar 48 is connected, as at 51, with a lever 52 journaled on the rocker shaft 14. A spring 53 having one end connected with the lever 52 and its other end connected with the ejector mechanism, to be later described, yieldably pulls the lever down to a position resting on the cam shaft. In this position the stop is in its operative condition with its end 50 engaging one of the notches 42.

Obviously it is necessary to disengage the stop before it is possible to advance the disc conveyer and to this end a collar member 54 having a pin 55 projecting from one side thereof, is fixed to the cam shaft alongside the lever 52 so that the pin in revolving strikes the lever 52 and lifts the same to disengage the stop. The location of the pin 55 with respect to the cam 45 is such that it strikes the lever 52 to disengage the stop just prior to the start of the active stroke of the lever 39 effected by the cam 45.

As soon as the stop is disengaged and the disc conveyer is given its initial forward movement, the end 50 of the bar is permitted to ride on the peripheral edge of the disc 37 to snap into the next adjacent notch 42, as the same is aligned therewith and positively arrest movement of the disc conveyer.

The resistor units "R" are fed in any suitable manner to a trough or channel 56 which conducts them to the disc conveyer to be picked up by its grooves 38. The channel or trough 56 is located near the top of the disc conveyer with its lower end terminating just above its periphery and in alignment with a notch 38 during its periods of rest. The resistor units are placed in the channel in a horizontal position and the lowermost unit is received in the adjacent notch 38 when the disc is at rest or rides on the periphery thereof during its advance.

Directly above the axis of the disc is the wire winding mechanism indicated generally by the numeral 57 and to which the units are carried by the disc conveyer just after they are received from the trough 56.

The wire winding mechanism is best illustrated in Figure 14 and comprises a hollow shaft 58 journaled on each side of the disc conveyer in bearings 59 and 60 carried respectively by the side plates and the cross piece 7. The axis of the hollow shafts 58 coincides with the axis of a unit positioned in the uppermost notch of the disc conveyer, and at the inner ends of the hollow shafts 58 inwardly of the bearings 60 are wire guiding or looping devices 61.

These looping devices each consist of a head 62 fixed to the inner end of a shaft 58 and provided with a radially oblique opening 63 which aligns with a similar opening 64 in the adjacent portion of the shaft. Mounted in the openings 64 of the looping means are pulleys 65 and carried by the heads 62 are brackets 66. The brackets 66 have similar pulleys 67 and have openings 68 communicating with the openings 63 in the heads.

The innermost ends of the brackets are directed at right angles as at 69 and have a wire passage 70 leading from the outer face of the bracket to the extremities of the angularly directed ends 69. These angularly directed ends of the brackets are spaced apart a distance substantially equal to the length of the resistor units and upon rotation of the shafts 58 wind wires 71 about the terminals of the units provided by end caps C. One revolution of the shafts 58 forms a complete loop of wire about each cap C.

The wire is conducted to the looping mechanism through the hollow shafts 58 and is trained over the pulleys 65 and 67 as clearly illustrated in Figure 14. During the looping of the wires about the terminals of the units, the unit having the wires applied thereto is held against displacement from the groove 38 of the disc conveyer in which it is received, by a shoe 72 carried by the cross piece 7 and overlying the conveyer.

Rotation is imparted to the shafts 58 by means of gear segments 73 pivotally mounted on the ends of the shaft 23 and meshing with pinions 74 carried by the outer ends of the shafts 58 and drivingly connected therewith through a one-way clutch structure indicated generally by the numeral 75. The gear segments 73 are oscillated about the shaft 23 by cranks 76 fixed to the ends of the shaft 27 which, as hereinbefore stated, is drivingly connected with the driven shaft 23. These cranks 76 carry slide blocks 77 slidable in openings 78 formed in the webs of the segments 73.

The shaft 27 being geared to the shaft 23 is continuously rotated and consequently the cranks 76 continuously impart oscillation to the segments 73, and as the shafts 58 which carry the looping mechanisms are to be rotated only in one direction the movement of the segments 73 in one direction is prevented from retracting the shafts by the one way clutch structures 75 which serve to drivingly connect the pinions 74 with their respective shafts 58.

The clutch structures are best illustrated in Figure 15 and each comprises a hub 79 keyed to its shaft 58 and recessed to receive a flange 80 on the inner end of the adjacent pinion 74. The inner annular wall 81 of the recess in the hub has notches 82 to form abutments with which spring urged pawls 83 carried by the flange 80 engage to impart rotation from the pinion 74 to the hub and then to the shaft during rotation of the pinion in one direction. During retrograde rotation of the pinion the pawls 83 obviously do not impart driving force to the hubs and to positively prevent rotation of the hubs and consequently the shafts 58 with their associated looping mechanism during such retrograde rotation of the pinions, a pawl 84 is provided to engage in a notch 85 in the outer surface of the hub.

The crank arms 76 are so located on the shaft 27 with respect to the position of the cam 45 on the cam shaft that the retrograde movement of the pinions 74 takes place during the advancement of the disc conveyer and the operative stroke of the gear segment 73 takes place during the rest period of the disc conveyer.

The wire to be looped about the unit terminals is fed to the hollow shafts 58 from spools supported by brackets 86, and being in a continuous length ties the resistor units together forming a chain of the units and the connecting links, which serves to hold the units in their respective notches 38.

After the loops are formed it is desirable to crimp them to tighten the same about the terminals and increase the contact therewith as illustrated in Figure 17. The crimping of the loops is effected at a point substantially in horizontal alignment with the axis of the disc conveyer, by mechanism indicated generally by the numeral 87.

The crimping mechanism is best illustrated in Figures 7 and 8 and comprises a pair of jaws 88 and 89 on each side of the disc conveyer to simultaneously engage the opposite ends of the units as they are alinged therewith. To facilitate mounting, the pair of jaws on one side of the disc conveyer is positioned below the pair of jaws on the other side thereof.

The jaws 89 are secured to hubs 90 by cap screws 91, and the hubs are fixed to upright arms 92 extended from hubs 93 freely journaled on a shaft 94 which extends across the machine. The upright arms are rockable about the shaft 94 to move the jaws 89 to positions with their outer ends engaging the end portions of the resistor units, as best illustrated in Figure 8.

The outer ends of the jaws 89 and also the jaws 88 have semi-circular grooves 95 which together form a tubular opening substantially equal to the diameter of the loops of wire about the resistor terminals so that when the jaws are brought together the loops are pulled tightly about the unit terminals.

The jaws 88 are secured to hubs 96 by cap screws 97 and the hubs 96 are journaled on the arms 92 above the hubs 90. To enable the jaws 88 and 89 to be positioned in common planes, the meeting ends of the hubs 90 and 96 are cut away, as at 98 and 99, respectively, and to provide clearance enabling pivotal movement of the hubs 96 carrying the jaws 88, the remaining portions of the adjacent ends of the hubs are each less than 180 degrees. A collar 100 fixed to each arm 92 above the hubs 96 holds the same on the arms 92.

During the movement of the disc conveyer to advance the resistor units, the jaws are separated, the jaws 89 of each pair being inside the annular path of the resistor units and the jaws 88 outside the path of the units. As the disc conveyer comes to rest after each forward movement, the jaws are brought together to crimp the loops as hereinbefore noted, by two sets of cams 101 and 102 located at opposite ends of the cam shaft and fixed thereto.

The cams 102 operate on bell crank levers 103 journalled on the rocker shaft and provided with rollers or cam followers 104 which track on the cams 102. Connecting rods 105 having one end connected with the levers 103, as at 106, extend across the machine at opposite sides of the disc conveyer at a downward angle to have their opposite ends connected, as at 107, with levers 108 rigidly associated with the arms 92 upon which the jaws 89 are rigidly fixed, so that as the high points of the cams 102 pass under the followers 104 the motion imparted to the levers 103 rocks the arms 92 about their pivotal mounting on the shaft 94 and moves the jaws 89 to their operative positions engaging the wire loops at the ends of the resistor units.

Springs 109 are connected with the levers 108 and a fixed support 110 to yieldably maintain the lever systems in positions engaging the cam followers 104 with their respective cams.

Immediately upon the proper positioning of the jaws 89 against the wire loops about the resistor unit ends, the cams 101 operate to move the jaws 88 toward crimping position. Cam followers 111 carried by bell cranks 112 also journalled on the rocker shaft 14 track on the cams 101 and rods 113 attached to the lower arms of the bell cranks 112, as at 114, transmit the motion of the cams to lateral arms 116 secured to the hubs 96 by cap screws 117 or the like, the rods being connected with the lateral arms through universal joints 115.

The lateral arms 116 are curved at their points of connection with the hubs 96 so as to provide sufficient clearance for the disc conveyer and to extend to the opposite side thereof and the universal joint connections 115 of the rods 113 with the lateral arms accommodate the swinging of the arms 92 about the axis of the shaft 94. The cams 101 and 102 which effect the closing of the crimper jaws are of such shape that the closing action of the jaws is entirely completed during the rest periods of the disc conveyer.

After the resistor units have had the wire loops about their terminals crimped to draw the same tightly about the terminals they continue with the disc conveyer to a point adjacent the bottom of the machine where a brush 118 at each side of the disc conveyer wipes the terminal members and the wire links connecting the units as they pass to apply a solder flux thereto.

The flux is conducted to the brushes through tubes 118' from a receptacle 119 mounted at the top of the machine. A valve controlled outlet 120 leads from the receptacle into a funnel-like header 121 with which the tubes 118' are connected to control the rate of flow.

Other means of conducting flux to the units obviously may be employed, and if desired a pump structure, not shown, may be used in place of the valved outlet 120 to positively force a predetermined amount of flux to the brushes 118 upon each intermittent advance of the conveyer.

A trough 122 positioned beneath the brushes 118 catches the excess flux and conducts it to a receptacle 123.

At the bottom of the disc conveyer the loops of wire about the terminals of the resistor units are soldered to the terminals by mechanism of novel construction, now about to be described.

Beneath the disc conveyer resting on the base 5 is a box-like supporting housing 124 in whose open top a solder pot 125 is supported. The solder pot 125 contains solder 126 maintained in a molten state by electrical heating units 127 extending into the solder pot. Mounted above the solder pot is a pump 128 which continuously pumps solder from the pot through a pair of nozzles 129 to bathe the looped ends of the resistor units as they are presented to the soldering mechanism.

The pump 128 may be of any suitable design and may be of the positive gear type. It is supported by a bracket 130 journalled on a cross shaft 131 which in turn is journalled in bearings carried by the side plates 6. The mechanism of the pump has a shaft 132 projected upwardly to mount a bevel gear 133 which meshes with a bevel gear 134 fixed to the shaft 131. At one outer end the shaft 131 has a pulley 135 which is driven from an electric motor 136 through a belt 137. The pump 128 is thus positively driven at all times and insures a constant flow of solder from the nozzles 129.

The inlet 138 to the pump is at all times submerged in the molten solder and its outlet is connected through a pipe 139 with the nozzles 129. The nozzles 129 are spaced apart to accommodate the disc conveyer and the resistor units carried thereby and when in operative position have their discharge openings positioned above the adjacent resistor unit ends so that streams of molten solder issuing therefrom flow over the resistor unit ends and completely bathe the looped wire and the metal terminals of the units.

The metal terminal caps of the units are provided with vent openings at their outer ends and while the streams of solder flow over the entire ends of the units, any gases within the caps are vented therefrom through the vent openings before the solder has a chance to set.

It is undesirable to retain the solder discharge nozzles in their operative positions during the movement of the disc conveyer to present the next unit, inasmuch as the wire links connecting the units would then receive an excessive amount of solder. Hence the entire pump together with the pipe 139 which carries the nozzles, is tilted about the axis of the shaft 131 to lower the nozzles beneath the path of the units during the advancing movement of the conveyer and to again elevate the same as the conveyer comes to rest.

To this end a lever 140 is fixed to the pump supporting bracket and projects a substantial distance beyond the housing 124 to be connected, as at 141, with a connecting rod 142 which extends upwardly to have its opposite end 143 connected to one arm of a bell crank lever 144, pivotally mounted on the rocker shaft 14. The other arm of the bell crank lever 144 carries a cam follower 145 which tracks on a cam 146 fixed to the cam shaft 13.

The cam 146 is so shaped that during the period of rest of the disc conveyer it presents a high period of dwell to the follower 145 and maintains the solder pump nozzles 129 in their elevated positions, but during the advancing movement of the disc conveyer the lower portion of the cam permits a spring 147 to draw the connecting rod 142 upwardly and tilt the nozzles 129 beneath the annular path of the resistor units.

A pair of electric soldering irons or the like 148 are mounted at each side of the disc conveyer by brackets 149, with their tips positioned to wipe the wire links as the disc conveyer carries the units therepast so as to wipe off any excess solder and insure clean leads.

As hereinbefore noted, the wire links connecting the units maintain the same on the disc conveyer from the time of application of the wires thereto, through their subjection to the crimping mechanism and the soldering apparatus, and the links remain uncut until just before the completed units are to be ejected from the machine.

The cutters for severing the links are substantially identical with the crimping mechanism and are actuated in a similar manner. This mechanism is located at a point substantially diametrically opposite the crimping mechanism and will now be described.

As in the crimping mechanism the cutters comprise a pair of jaws 150 and 151 on each side of the disc conveyer and as best illustrated in Figure 9 the cutter jaws are very similar to the crimper jaws and differ therefrom only in the construction of their extreme ends which engage the units. As in the crimper mechanism, the ends of the jaws 150 and 151 are provided with semi-circular channels or grooves 152 and 153 respectively, which come together to receive the looped unit ends therebetween, but one side 154 of the groove or channel 152 in the outer ends of the jaws 150 projects beyond the plane of the other side, and the adjacent top portion of the jaws 150 is cut away or relieved as at 155 to accommodate the extended side 156 of the grooves 153 of the jaws 151.

The sides 154 and 156 thus overlap and provide a shearing action between which the wire links connecting the units are severed, and as the groove sides 152 are comparatively narrow, the severing of the links takes place very close to the terminal heads.

The jaws 150 of the cutter mechanism correspond to the jaws 89 of the crimper mechanism and are mounted from arms 157 in a similar manner and the jaws 151 are rotatably mounted on the arms 157 by hubs 158. The arms 157 are journalled on a cross shaft 159 and have levers 160 extended therefrom which, through connecting rods 161 are connected with arms 162 of the bell crank levers 103 so that the arms 157 and 92 are simultaneously rocked about their respective cross shafts 159 and 94 by the cams 102.

The jaws 151 like the jaws 88 on the crimper mechanism have lateral arms 163 connected therewith whose outer ends are connected as at 164 with connecting rods 165. The connecting rods 165 extend across the machine to have their ends 166 connected with the long arms 167 of levers 168 journalled on the cross shaft 94. The short arms 169 of the levers 168 have one end of connecting rods 170 connected thereto as at 171 whose opposite ends are connected with the bell cranks 112 as at 172 so that the cams 101 which actuate the jaws 88 of the crimper mechanism also simultaneously actuate the jaws 151 of the cutter mechanism.

The outward rocking of the arms 92 and the arms 157 of the crimper mechanism and the cutter mechanism respectively, is preferably limited by adjustable stops indicated generally by the numeral 173. These stops 173 may be of any suitable construction and in the present instance comprise screws 174 threaded in the cross bars 9 and 10 with their ends projecting therefrom to engage the adjacent upper ends of the arms 92 and 157 which for lightness are of tubular construction. The screws 174 are obviously adjustable and lock nuts 175 are provided to secure the same in adjusted position.

After the wire links between the units are severed by the cutting mechanism the units are obviously loose and to prevent them from dropping out of their respective disc conveyer grooves 38 a guide 176 is provided. This guide is an arcuately shaped member having mounting brackets 177 extended from its outer surface to receive the cross bar 10 and the cross shaft 159 so that the guide is mounted with its inner surface concentric to the peripheral edge of the disc conveyer. Thus the resistor units are prevented from dropping out of the grooves in the disc conveyer after the links of wire connecting them are severed, and at the top of the guide 176 is the ejector, now about to be described.

The ejector comprises a curved lever 178 pivotally mounted as at 179 from a fixed bracket 180 carried by the angle iron cross piece 8. The lower curved end of the lever 178 is bifurcated as at 181, see Figure 10, to position its arms 182 on opposite sides of the disc conveyer. A stop 183 at the upper end of the lever engages the mounting bracket to hold the lever against the action of the spring 53 whose lower end is hooked onto the lever as at 184, in a position with the lower ends of its bifurcated arms 182 disposed inwardly of the inner periphery of the guide 176 sufficiently to enable the resistor units advanced by the disc conveyer to engage the upper curved surface of the arms as best illustrated in Figure 11.

As the disc conveyer is advanced, the upward movement of the resistor unit engaging the bifurcated arms of the lever forces the lever inwardly about its pivotal mounting 179 and places the spring 53 under greater tension until the unit is carried by the advancing disc conveyer, above the upper end of the guide 176 at which time the lever will be snapped outwardly by the spring 53 to forcibly eject the unit. A suitable receptacle 185 may be supported from the machine or any other suitable support to catch the finished units as they are ejected from the conveyer disc.

The resistor units may be fed to the trough 56 which conducts them to the disc conveyer manually or by any suitable automatic feeding mechanism and in the present instance a hopper 186 is provided to receive a plurality of resistor units to be fed to the trough 56. This hopper has a substantially semicircular bottom and is of such width as to accommodate the length of the units. The extreme bottom is open, as at 187, and a pair of star wheels 188 are mounted in the opening to, upon simultaneous rotation towards each other, agitate the resistor units in the hopper and pass them down into the trough 56 one at a time to prevent jamming.

The drive for the star wheels is from the shaft 23 through a pulley 189 fixed to a shaft drivingly connected through a belt 190, to a pulley 191 on a shaft 192, which is connected with one of the star wheels. Meshed gears 193 positively connect the wheels and insure their simultaneous rotation towards each other.

It is observed that the diameters of the wheels is such that while they pass the units down into the trough singly, the space between their greatest diameters is sufficient to enable a unit to pass therethrough so that the units are not positively forced down into the trough.

From the foregoing description, taken in connection with the accompanying drawings, it will be readily apparent to those skilled in the art to which an invention of the character described appertains, that the machine of this invention provides a novel automatic means for attaching wire leads to the terminals of resistor units and the like, and that by reason of the fact that the wire is taken from spools in continuous lengths and that it is wound on the unit terminals before it is cut, a continuous manufacturing process is provided. It is also apparent that utilizing the leads to tie the units together to form a chain, provides a novel and simple means for holding the units on the conveyer. The particular manner of soldering the wire leads to the unit terminals also insures a positive connection within a minimum time.

It is further noted that the machine of this invention is readily adaptable to units of different lengths and diameters and also to different lengths of leads to be applied, for by providing discs of different thicknesses and with grooves of different dimensions, a single machine may be used for many different sized units, and as the length of the leads is governed by the pitch of the notches in the disc conveyer, it is only necessary to change the pitch of the notches and to correspondingly change the cam which drives the advancing means, if leads of different length are desired.

What I claim as my invention is:

1. The hereindescribed method of applying wire leads to the terminals of electrical resistor units which comprises conveying a plurality of units along a fixed path, looping continuous lengths of wire from spools successively about the terminals of the units as they are conveyed along said path and thereby connecting the units by wire links, soldering the wire loops to the resistor unit terminals, and cutting the links to separate the units.

2. The hereindescribed method of applying wire leads to the terminals of electrical resistor units which comprises conveying the units along a fixed path, simultaneously looping wire in continuous lengths about the terminals of the units as they are conveyed along said path to connect the units by wire links, tightening the loops about the terminals, soldering the loops to the terminals, and cutting the links to separate the units.

3. The hereindescribed method of applying wire leads to the terminals of electrical resistor units which comprises conveying the units along a fixed path, looping a continuous length of wire successively about the terminals of the units as they are conveyed along said path to connect the units by wire links, pouring molten solder over the terminals of the resistor units to solder the loops of wire thereto, and cutting the wire links to separate the units.

4. In a machine for applying wire leads to electrical resistor units, a conveyer for carrying the resistor units through the machine, means for looping wire about the terminals of the resistor units as they are conveyed through the machine, and means for soldering the loops of wire to the terminals of the resistor units.

5. A machine for applying wire leads to the terminals of electrical resistor units comprising, wire looping mechanism for looping wire from a spool about the terminals of the resistor units, a conveyer for successively presenting resistor units to the wire looping mechanism, and means for soldering the looped portions of wire to the terminals of the resistor units.

6. A machine for applying wire leads to the terminals of electrical resistor units comprising, a wire looping mechanism, a conveyer for carrying resistor units through the machine and successively presenting units to the wire looping mechanism, said wire looping mechanism looping wire successively about the terminals of the resistor units as they are presented thereto and thereby connecting the units by wire links, means for soldering the loops of wire to the terminals of the resistor units, and means for cutting the links to separate the units.

7. A machine for applying wire leads to electrical resistor units comprising, mechanism for looping a continuous length of wire about the terminals of the units presented thereto, means for pouring molten solder over the terminals to solder the loops of wire thereto, and a conveyer for successively presenting resistor units first to the wire looping mechanism and then to the means for soldering the loops to the terminals.

8. A machine for attaching wire leads to the terminals of electrical resistor units and the like comprising, a conveyer for carrying the units through the machine, wire looping mechanism for looping a continuous length of wire about the terminals as they are presented to the wire looping mechanism whereby the resistor units are connected by links of wire, crimping means engageable with the wire loops about the terminals to tighten the same, means for applying molten solder to the terminals to solder the loops thereto, means for cutting the wire links to separate the units, and means for ejecting the units from the machine after the links are cut.

9. In a machine for attaching wire leads to the terminals of electrical resistor units and the like, a conveyer having notches to receive the units, means for intermittently advancing the conveyer to carry the units through the machine, wire looping mechanism operable to wind a continuous length of wire successively about the terminals of the units as they are presented thereto by the advancing conveyer whereby the units are connected by wire links which serve to maintain the units in the notches of the conveyer, means for soldering the loops to the terminals, and means for cutting the links to separate the units and release the same for removal from the conveyer notches.

10. In a machine for applying wire leads to the terminals of electrical resistor units, including a conveyer for carrying the units through the machine and means for looping a continuous length of wire successively about the terminals of the units as they move through the machine, means for soldering the wire loops to the terminals comprising, a heated receptacle containing molten solder, and a pump for projecting a stream of molten solder over the loops about the resistor unit terminals as the units move through the machine.

11. In a machine for applying wire leads to the terminals of electrical resistor units, a conveyer for carrying units through the machine, mechanism for looping wire about the terminals of the units as they move through the machine, and means for soldering the wire loops to the unit terminals comprising, a heated receptacle containing molten solder, a nozzle, a pump for forcing molten solder from the heated receptacle to the nozzle, means for supporting the nozzle for movement to and from a position directing a stream of molten solder over the unit terminals, and means for moving the nozzle to and from said position.

12. In a machine for applying wire leads to the terminals of electrical resistor units, an intermittently advancing conveyer for carrying units through the machine, means for looping continuous lengths of wire about the terminals of the units as they are carried through the machine, the wire forming links to connect the units, means for soldering the wire loops to the terminals comprising, a heated receptacle containing molten solder, a nozzle, a pump for forcing molten solder from the receptacle to the nozzle to issue therefrom, means mounting the nozzle for movement to and from a position directing the stream of solder issuing therefrom over the path of the units as they are carried through the machine, and means to intermittently move the nozzle to and from said position whereby the molten solder issuing therefrom flows over the terminals but does not flow over the wire links connecting the units.

13. In a machine for applying wire leads to the terminals of electrical resistor units, a conveyer for carrying units through the machine, means for intermittently advancing the conveyer, mechanism for looping wire from a continuous length successively about the terminals of the units as they are intermittently advanced through the machine whereby the units are connected by wire links, means for applying a solder flux to the terminals and the wire loops as the units are intermittently advanced through the machine, a soldering mechanism for soldering the loops to the terminals comprising, a heated receptacle containing molten solder, a nozzle, a pump for forcing molten solder to the nozzle, means mounting the nozzle for movement to and from a position directing the stream of molten solder issuing therefrom over the path of the units, and cam actuated means for holding the nozzle in its position directing the stream of solder issuing therefrom over the path of the units during the periods of rest of the conveyer and the units carried thereby and for effecting movement of the nozzle to a position at which the stream of solder issuing therefrom returns to the receptacle without crossing the path of the units.

14. In a machine for applying wire leads to the terminals of electrical resistor units and the like, a conveyer for intermittently advancing resistor units through the machine, wire looping mechanism for winding wire from continuous lengths about the terminals of the units whereby the units are connected by wire links, means for applying solder flux to the terminals and the wire loops thereof as the units are advanced through the machine, mechanism for soldering the loops to the terminals comprising nozzles, means for producing a continuous flow of molten solder from the nozzles, means mounting the nozzles for movement to and from positions directing the streams of solder issuing therefrom over the path of the units through the machine, means for holding the nozzles in said position during the periods of rest of the conveyer and the units carried thereby and for holding the nozzles in a position directing the streams of solder issuing therefrom past the path of the units so as not to contact the wire links connecting the units during the intermittent advance of the units through the machine, and means for wiping off excess solder from the wire links connecting the units.

15. In a machine for applying wire leads to electrical resistor units including a drive shaft, soldering mechanism comprising, a heated receptacle containing molten solder, a nozzle, a fluid pump for forcing molten solder from the receptacle to the nozzle, the molten solder issuing from the nozzle returning to the receptacle, and means suspending the fluid pump and the nozzle from the drive shaft whereby the fluid pump and nozzle are movable about the axis of the drive shaft, a gear connection between the drive shaft and the fluid pump for imparting driving force from the shaft to the pump while enabling movement of the pump and the nozzle about the axis of the shaft, and means for driving the shaft.

16. In a machine for applying wire leads to the terminals of electrical resistor units and the like, a wire looping mechanism for looping wire in a continuous length about the terminals of units presented thereto comprising, a rotatable tubular shaft, through which the wire reaches the looping mechanism, means at one end of the shaft for guiding the wire to form a loop about a resistor unit terminal upon rotation of the shaft, and means for rotating the shaft.

17. In a machine for applying wire leads to the terminals of electrical resistor units, a conveyer for intermittently advancing the units through the machine, mechanism for applying wire from a spool to the terminals of the units comprising, a tubular shaft with which the units are successively axially aligned by the intermittent advance of the conveyer, means at the end of the tubular shaft adjacent the conveyer for guiding the wire extending through the tubular shaft from a spool to form a loop about the resistor unit terminal aligned with the shaft upon rotation of the shaft, and means for rotating the shaft.

18. A machine for applying wire leads to terminals of electrical resistor units including, a conveyer for intermittently advancing units through the machine, mechanism for looping a continuous length of wire about the terminals of the units as they are intermittently advanced through the machine to connect the units by wire links and comprising, a rotatable tubular shaft through which a continuous length of wire is fed, the units being successively axially aligned with the tubular shaft during the intermittent advance of the conveyer, a wire guide carried by the tubular shaft and eccentric thereto to swing about the axis of the tubular shaft upon rotation thereof and loop the wire about the resistor unit terminals as they are aligned with the shaft, and means for rotating the shaft.

19. A machine for applying wire leads to terminals of electrical resistor units comprising a conveyer for intermittently advancing units through the machine, mechanism for looping a continuous length of wire about the terminals of the units as they are intermittently advanced through the machine to connect the units by wire links and comprising, a rotatable tubular shaft through which a continuous length of wire is fed, the units being successively axially aligned with the tubular shaft during the intermittent advance of the conveyer, a wire guide carried by the tubular shaft and eccentric thereto to swing about the axis of the tubular shaft upon rotation thereof and loop the wire about the resistor unit terminals as they are aligned with the shaft, and means for co-ordinating the intermittent advance of the conveyer to the rotation of the tubular shaft so that the rotation of the tubular shaft occurs during the rest period of the conveyer.

20. In a machine for applying wire leads to the terminals of electrical resistor units, a conveyer for carrying the units through the machine, means for intermittently advancing the conveyer, mechanism for looping wire from a continuous length taken from a spool, about the terminals of the units and comprising, a tubular shaft through which a wire from the spool is conducted, a wire guide carried by the tubular shaft adjacent the path of the units and eccentric to the axis of the tubular shaft to loop the wire about the unit terminals as the units are aligned with the axis of the tubular shaft by the advance of the conveyer and upon rotation of the tubular shaft, and means for intermittently rotating the tubular shaft comprising, a gear segment, means for oscillating the gear segment, a pinion meshing with the gear segment and mounted on the tubular shaft, and ratchet means for rotating the tubular shaft upon rotation of the pinion gear in one direction.

21. In a machine for applying wire leads to electrical resistor units, a conveyer for intermittently advancing the units through the machine, mechanism for looping a continuous length of wire successively about the terminals of the units as they are advanced through the machine, and means for tightening the wire loops comprising, a pair of jaws adapted to grip the looped ends of the units, and means for closing the jaws onto the looped ends of the units during the periods of rest of the conveyer and for opening the jaws to disengage the looped ends of the units to enable intermittent advance of the units through the machine.

22. In a machine for applying wire leads to the terminals of electrical resistor units and the like, a conveyer for intermittently advancing the units through the machine, mechanism for looping a continuous length of wire successively about the terminals of the units as they are intermittently advanced through the machine, a crimper mechanism for tightening the wire loops about the terminals comprising, a pair of jaws adapted to clamp the looped ends of the units, a pivoted arm mounting one of the jaws for movement at one side of the path of the units into and out of engagement with the looped ends of the units, means journaled on said arm and mounting the other jaws, means co-ordinated with the intermittent advance of the conveyer for swinging said arm to engage its jaw with the unit and for rotating the other jaw about the axis of the arm to engage the same with the unit during the periods of rest of the conveyer.

23. In a machine for applying wire leads to the terminals of electrical resistor units, a conveyer for intermittently advancing the units through the machine, a wire looping mechanism for looping a continuous length of wire successively about the terminals of the units as they are intermittently advanced through the machine and connecting the units by wire links, means for soldering the wire loops to the terminals, and means for cutting the links connecting the terminals comprising, a pair of jaws movable together in a shearing action from opposite sides of the wire links, and means co-ordinated with the intermittent advance of the conveyer carrying the units through the machine for actuating said cutting jaws during the periods of rest of the conveyer.

24. In a machine of the character described, a conveyer for carrying articles through the machine and an ejector for forcibly removing the articles from the conveyer comprising, a fixed guide for holding the articles on a conveyer and along which the articles move with the advance of the conveyer, a member movably mounted and having a portion lying in the path of the advancing units adjacent one end of the fixed guide, spring means yieldably urging said member in the direction of the fixed guide, whereby the advance of the units with the conveyer through their engagement with the fixed holding means moves the said movable member against the action of its spring means to place the spring means in tension, whereby the article is forcibly projected from the conveyer upon its reaching the end of the fixed guide.

25. In a machine for applying wire leads to the terminals of electrical resistor units, a conveyer having notches to receive the units, mechanism for applying wire from a continuous length successively to the terminals of the units as they advance through the machine, mechanism for soldering the loops of wire to the terminals, and means for forcibly removing the units from the notches in the conveyer comprising, a holding member parallel to the edge of the conveyer and closing the notches to hold the units therein, a pivoted lever having one end adjacent one end of the holding member and lying in the path of the units advanced by the conveyer, and a spring connected with the pivoted lever yieldably urging said end of the lever toward the holding member, said lever being moved to place the spring under tension by an advancing unit carried by the conveyer until the unit reaches the end of the holding member whereupon the stored energy of the spring forcibly ejects the same from the groove in the conveyer.

26. In a machine for applying wire leads to the terminals of electrical resistor units, a disc having notches in its periphery adapted to receive units, means for intermittently advancing the disc, mechanism for looping wire from a continuous length about the terminals of the units as they are intermittently advanced whereby the units are connected by wire links, mechanism for crimping the wire loops tightly about the unit terminals, mechanism for soldering the loops to the terminals, mechanism for cutting the wire links to separate the units, and a continuously operating cam shaft for initiating the advance of the conveyer and the actuation of the crimper and cutting mechanisms.

27. The method of applying leads to articles which comprises, conveying the articles along a fixed path, looping a flexible member of indefinite length successively about each of the articles as they are conveyed along said fixed path, and cutting the member between the articles to separate the same.

28. The method of applying leads to articles which comprises, looping an integral continuous flexible element successively about a plurality of spaced articles to connect the articles, securing the loops to the articles, and cutting the flexible element between the articles to separate the same.

29. In a machine for applying leads to articles, a conveyer adapted to carry the articles through the machine, and mechanism for feeding the units singly to the conveyer, comprising a hopper having an opening in its bottom, a chute extending from the hopper to the conveyer, and a pair of star wheels beneath the hopper bottom to close the opening therein except for a restricted passage between the star wheels through which the articles are conducted from the hopper to the chute, said star wheels being spaced apart a distance such that an article is free to pass between two opposite high points of the star wheels, and means for continuously rotating the star wheels to agitate the articles in the hopper.

30. In a machine of the character described, a conveyer to carry articles to be soldered through the machine in a fixed path, mechanism to solder the articles as they are conveyed along said fixed path comprising, a receptacle containing molten solder, a nozzle, means to continuously pump molten solder from the receptacle to the nozzle so that the molten solder flows in a continuous stream from the nozzle, and means to move the nozzle to and from a position directing the stream of molten solder over the path of the articles to be soldered, said means being synchronized with the conveyer so that the nozzle is positioned to discharge the molten solder over the path of the articles only when the articles are in a position to receive the solder.

31. In a machine to solder articles, a conveyer to move the articles to be soldered intermittently along a fixed path and in spaced relation, a nozzle, means to cause molten solder to issue from the nozzle continuously, and means to automatically move the nozzle to a position discharging the molten solder over the articles as they are presented to the nozzle by the conveyer.

In testimony whereof I have hereunto affixed my signature.

WALTER S. FREEBURG.